Patented Mar. 31, 1925.

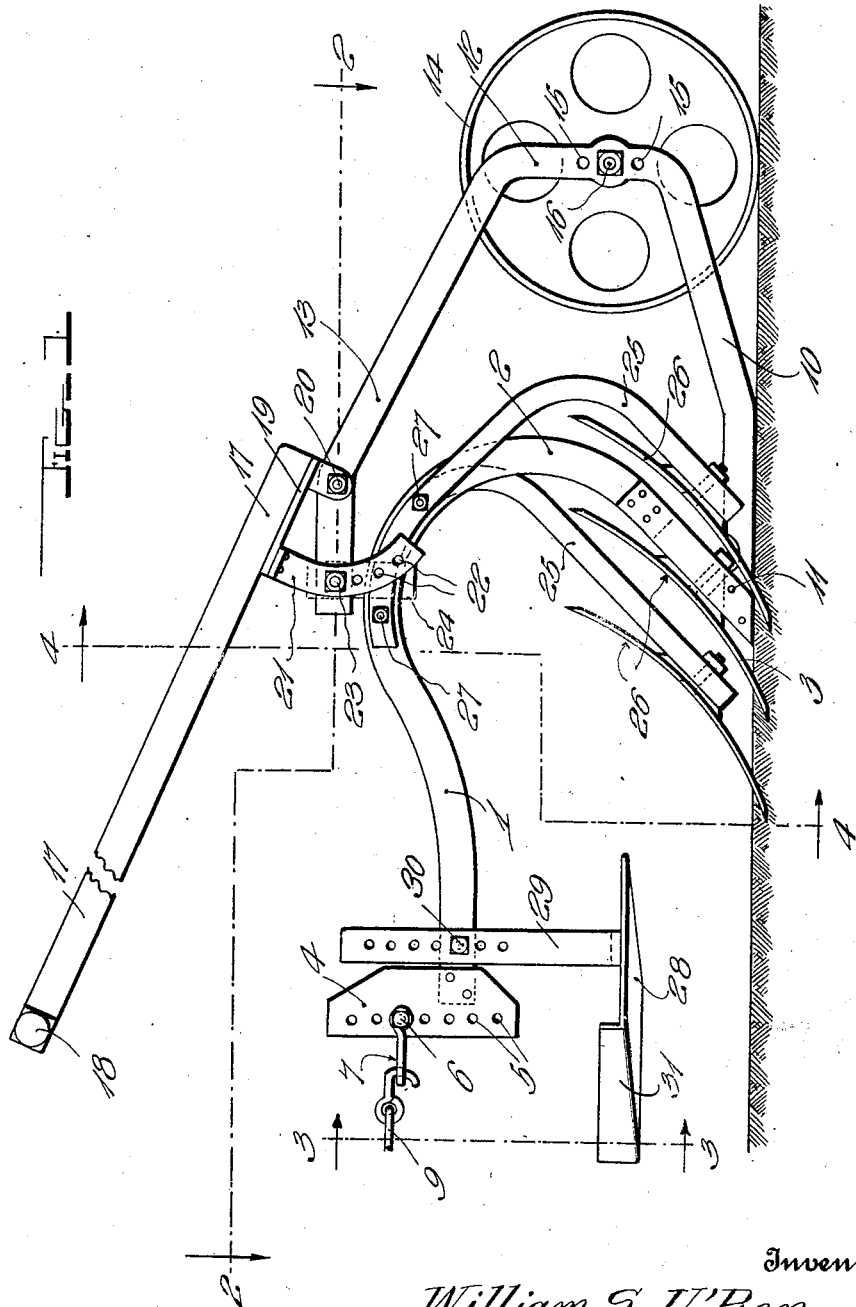

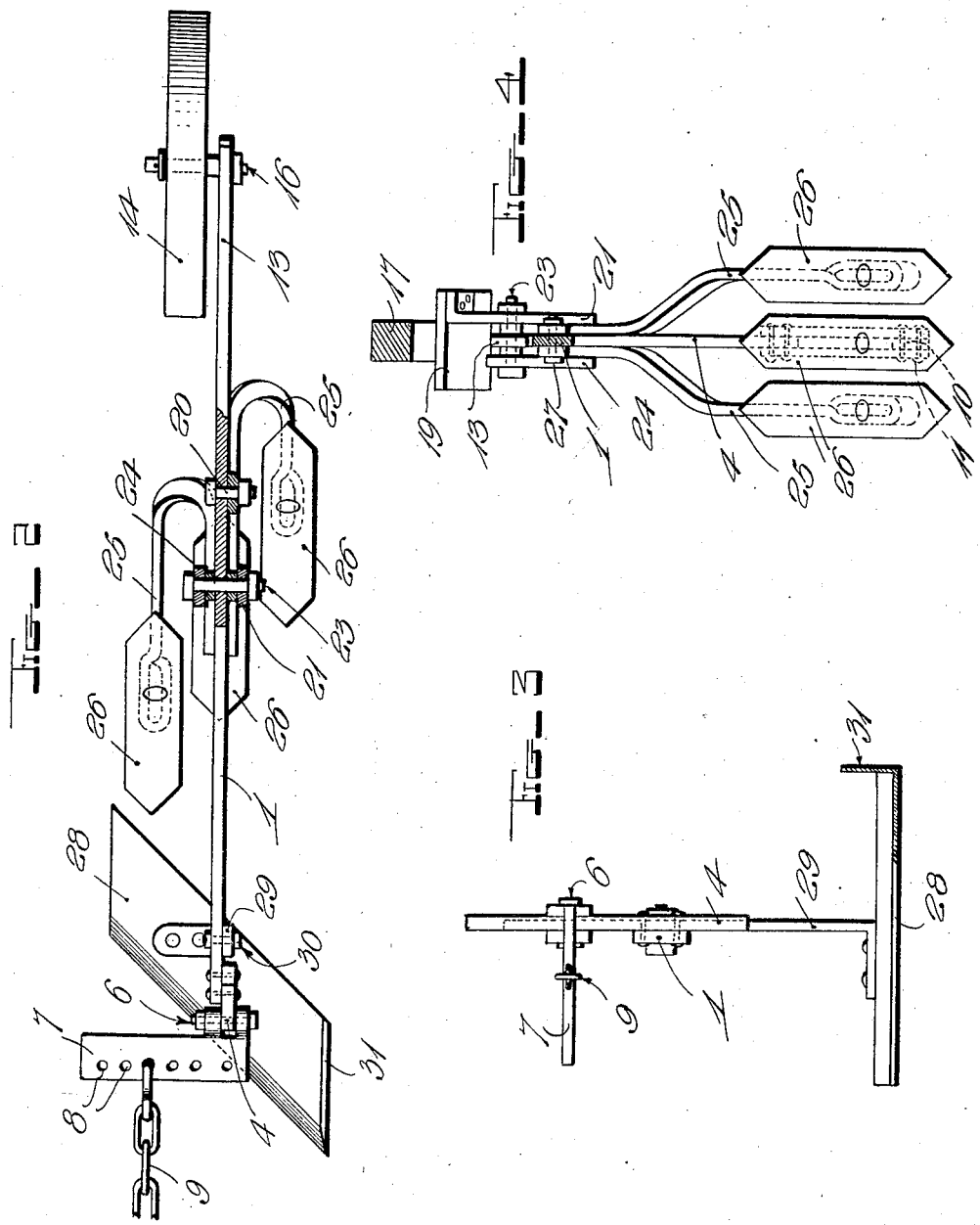

1,531,584

UNITED STATES PATENT OFFICE.

WILLIAM S. U'REN, OF PORTLAND, OREGON.

GARDEN IMPLEMENT.

Application filed June 11, 1923. Serial No. 644,731.

*To all whom it may concern:*

Be it known that I, WILLIAM S. U'REN, a citizen of the United States, residing at Portland, in the county of Multnomah and State of Oregon, have invented certain new and useful Improvements in Garden Implements; and I do declare the following to be a full, clear, and exact description of the invention, such as will enable others skilled in the art to which it appertains to make and use the same.

My invention relates to improvements in earth working implements and more particularly to those which are pulled manually, the main object being to provide an implement in which the pulling is done by a draft device which leaves the user's arms free, and to provide the implement with novel means including a forwardly extending handle gripped by the operator's hands, to steer and control the depth of cut.

With the foregoing in view, the invention resides in the novel subject matter hereinafter described and claimed, the description being supplemented by the accompanying drawings.

Figure 1 is a side elevation of an implement constructed in accordance with my invention.

Figure 2 is a horizontal sectional view partly in elevation as indicated by line 2—2 of Fig. 1.

Figures 3 and 4 are vertical transverse sectional views as indicated by lines 3—3 and 4—4 respectively of Fig. 1.

In the drawings above briefly described, the numeral 1 designates a beam having a downturned rear end 2 for carrying a cultivator blade 3 or any other desired earth-working plow or blade. At the front end of the beam 1, I have provided a vertical plate 4 having spaced openings 5 to receive a bolt 6 by means of which a horizontal transverse plate 7 may be attached at any desired elevation. This transverse plate 7 is provided with spaced openings 8 in which a chain 9 or other draft device may be hooked at the proper point to insure the proper line of pull. The chain or the like 9 is intended to be connected with a suitable belt or the like (not shown) for engagement with the user's hips or shoulders.

A metal bar 10 is rigidly secured at 11 to the lower end of the beam 2 or forged as a part of that beam, and extends rearwardly therefrom, then upwardly as indicated at 12 and extends then forwardly as disclosed at 13, with its free end disposed over the rear portion of the beam. The upwardly extending bar portion 12 carries a ground wheel 14 which may be connected therewith at different elevations, through the instrumentality of bolt-holes 15 and a bolt 16. The forwardly extending end of the bar carries a rigid forwardly extending handle 17 having a cross-arm 18 at its front end to be held in the user's hand. By raising and lowering this handle, it will be seen that the entire implement will be tilted, thus effectively regulating the depth of cut. Also, the handle 17 is advantageous in accurately steering the implement.

In the preferred form of construction, the rear end of the handle 17 is bolted or otherwise secured to a plate 19 which is pivoted at 20 to the bar end 13, permitting vertical adjustment of the handle. To hold this handle in adjusted position, I have provided it with a depending arcuate plate 21 having spaced bolt-holes 22 through any one of which a bolt 23 may be passed for securing the plate to the bar end 13. The plate 21 preferably extends below the bar end 13 and co-operates with a second depending plate 24, in preventing relative lateral movement of the bar end 13 and the beam 1, the two plates being disposed at opposite sides of said beam as shown. The upper end of plate 24 is preferably secured by means of bolt 23.

The implement is preferably constructed with a pair of supplemental beams 25 to carry additional cultivator blades 26 or other desired earth-working means. These supplemental beams however are detachably secured to the main beam 2 by bolts 27 or other suitable means, permitting them to be readily attached or detached as occasion may require.

In connection with the features above described, I preferably provide a substantially horizontal obliquely disposed weed-cutting blade 28 having a central standard 29 detachably and adjustably secured at 30 to the front end of the beam 1. One longitudinal edge of this blade is provided with an upstanding flange 31 which is visible at the surface of the ground when the blade 28 is operating beneath such surface. Thus, the operator can at all times know the position of the blade and consequently can avoid running sufficiently close to plants, to injure the same.

In operating the implement, the user walks backwards, pulling upon the draft device 9 and manipulating the handle 17 in the required manner. By forcing downwardly upon this handle and adjusting the plate 7 on the upright plate 4, when necessary, the cultivator blades or the like may be made to penetrate the earth more deeply, whereas upward movement of the handle or reverse adjustment of plate 7, will produce the opposite result. Thus, the depth of cut may be accurately controlled at all times and the implement may be effectively steered to work the earth at the exact places desired.

Excellent results are obtainable from the general construction shown and described and this construction may therefore be considered as the preferred form of my invention. It is to be understood however that within the scope of the invention as claimed, numerous minor changes may be made.

I claim:

1. An implement comprising a beam having a draft device at its front end for pulling it manually and provided with a downturned rear end adapted to carry an earth working blade, a bar connected to said downturned rear end of said beam and extending rearwardly, upwardly and forwardly, a rigid longitudinal handle secured to and extending forwardly from the forwardly extending end of said bar, and a ground wheel carried by said bar in rear of said beam.

2. An implement comprising a beam having a draft device at its front end for pulling it manually and provided with a downturned rear end adapted to carry an earth working blade, a bar connected to said downturned rear end of said beam and extending rearwardly, upwardly and forwardly, a rigid longitudinal handle secured to and extending forwardly from the forwardly extending end of said bar, a pair of guides secured to said forwardly extending end of said bar and straddling said beam, and a ground wheel carried by said bar in rear of said beam.

3. An implement comprising a beam having a draft device at its front end for pulling it manually and provided with a downturned rear end adapted to carry an earthworking blade, a bar connected to said downturned rear end of said beam and extending rearwardly, upwardly and forwardly, a longitudinal handle pivoted for vertical adjustment to the forwardly extending end of said bar, a plate depending from said handle in front of its pivot, means for securing said plate to said bar to hold the handle in adjusted position, a second plate secured to said forwardly extending end of said bar, the two plates extending downwardly and straddling said beam, and a ground wheel carried by said bar in rear of said beam.

In testimony whereof I have hereunto affixed my signature.

WILLIAM S. U'REN.